US010669103B2

(12) United States Patent
Heppe et al.

(10) Patent No.: US 10,669,103 B2
(45) Date of Patent: Jun. 2, 2020

(54) TRANSPORT DEVICE FOR TRANSPORTING OBJECTS FROM WORK STATION TO WORK STATION OF A PRODUCTION SYSTEM AND PRODUCTION SYSTEM FOR THE MANUFACTURING OF PRODUCTS WITH A TRANSPORT DEVICE OF THIS TYPE

(71) Applicant: FRESENIUS MEDICAL CARE DEUTSCHLAND GMBH, Bad Homburg (DE)

(72) Inventors: John Heppe, St. Wendel (DE); Franz Kugelmann, St. Wendel (DE); Matthias Meisinger, Marpingen (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 16/487,440

(22) PCT Filed: Feb. 26, 2018

(86) PCT No.: PCT/EP2018/054715
§ 371 (c)(1),
(2) Date: Aug. 21, 2019

(87) PCT Pub. No.: WO2018/158204
PCT Pub. Date: Sep. 7, 2018

(65) Prior Publication Data
US 2020/0061808 A1    Feb. 27, 2020

(30) Foreign Application Priority Data
Feb. 28, 2017 (DE) .................... 10 2017 001 828

(51) Int. Cl.
*B65G 29/00*    (2006.01)
*B65G 47/80*    (2006.01)
(Continued)

(52) U.S. Cl.
CPC .............. *B65G 29/00* (2013.01); *B23Q 7/02* (2013.01); *B23Q 7/1426* (2013.01);
(Continued)

(58) Field of Classification Search
CPC ...... B65G 29/00; B65G 47/80; B65G 47/846; B23Q 7/02; B23Q 7/1426; B23Q 39/042; B65B 43/50
See application file for complete search history.

(56) References Cited

U.S. PATENT DOCUMENTS 3,647,043 A * 3/1972 Garetto ................. B23Q 1/522
198/345.3
4,570,782 A * 2/1986 Cargill .................. B65G 29/00
198/345.3
(Continued)

FOREIGN PATENT DOCUMENTS

DE         2808040 A1    8/1979
DE     102009027462 A1    1/2011
(Continued)

OTHER PUBLICATIONS

International Search Report and Written Opinion issued in corresponding International Patent Application No. PCT/EP2018/054715 (with English translation of International Search Report) dated Jun. 6, 2018 (11 pages).
(Continued)

*Primary Examiner* — Gene O Crawford
*Assistant Examiner* — Keith R Campbell
(74) *Attorney, Agent, or Firm* — Kilyk & Bowersox, P.L.L.C.

(57) ABSTRACT

A transport device for transporting objects from workstation to workstation in a production system is described along with a production system for manufacturing products, in particular containers filled with a medical product. The transport device has a stationary assembly 2, an object carrier 3 rotatable about an axis of rotation 4 in successive work cycles, a plurality of object carrier elements 6, which
(Continued)

Figure 1:
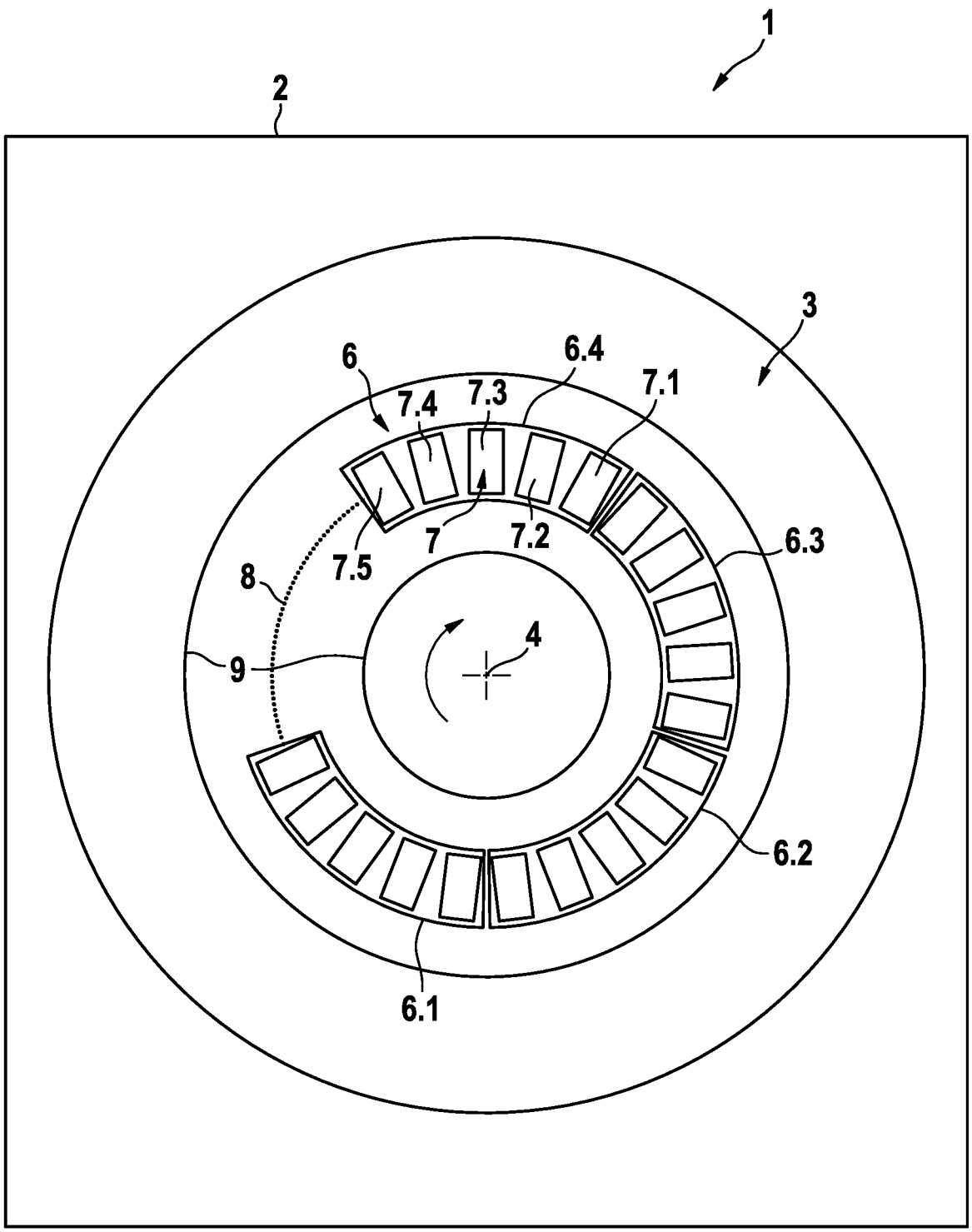

are arranged circumferentially distributed and movable relative to the object carrier on a circular path 8, and to which coupling elements 14 are assigned, which can take on only a first switching position or a second switching position.

15 Claims, 9 Drawing Sheets

(51) Int. Cl.
| | | |
|---|---|---|
| *B65B 43/50* | (2006.01) | |
| *B23Q 7/02* | (2006.01) | |
| *B23Q 7/14* | (2006.01) | |
| *B23Q 39/04* | (2006.01) | |
| *B65G 47/84* | (2006.01) | |

(52) U.S. Cl.
CPC .......... *B23Q 39/042* (2013.01); *B65B 43/50* (2013.01); *B65G 47/80* (2013.01); *B65G 47/846* (2013.01)

(56) References Cited

U.S. PATENT DOCUMENTS

| | | |
|---|---|---|
| 5,107,976 A | 4/1992 | Strasser et al. |
| 9,566,678 B2* | 2/2017 | Garcia Calderon ..... B23Q 1/38 |
| 2012/0090954 A1 | 4/2012 | Krauss et al. |
| 2019/0105749 A1* | 4/2019 | Heppe .................... B23Q 16/10 |
| 2019/0283193 A1* | 9/2019 | Heppe ................. B65G 47/846 |

FOREIGN PATENT DOCUMENTS

| | | |
|---|---|---|
| DE | 102013210596 A1 | 12/2014 |
| EP | 0446659 A2 | 9/1991 |
| FR | 2045428 A5 | 2/1971 |
| FR | 2933681 A1 | 1/2010 |
| GB | 2014966 A | 9/1979 |

OTHER PUBLICATIONS

International Preliminary Report on Patentability issued in corresponding International Patent Application No. PCT/EP2018/054715 dated Sep. 3, 2019 (with English translation) (7 pages).

* cited by examiner

TRANSPORT DEVICE FOR TRANSPORTING OBJECTS FROM WORK STATION TO WORK STATION OF A PRODUCTION SYSTEM AND PRODUCTION SYSTEM FOR THE MANUFACTURING OF PRODUCTS WITH A TRANSPORT DEVICE OF THIS TYPE

This application is a National Stage Application of PCT/EP2018/054715, filed Feb. 26, 2018, which claims priority to German Patent Application No. 10 2017 001 828.6, filed Feb. 28, 2017.

The invention relates to a transport device for transporting objects from workstation to workstation in a production system comprising a stationary assembly, an object carrier rotatable about an axis of rotation in successive work cycles, a plurality of object carrier elements, arranged circumferentially distributed and movable relative to the object carrier on a circular path, for depositing one or more objects, and a drive unit for driving the object carrier. The invention further relates to a production system for manufacturing products, in particular containers filled with a medical product.

In production systems for manufacturing products, turntables, also known as rotary tables or indexing tables, are used for transporting the products from workstation to workstation. The known indexing tables comprise a circular object carrier which is rotatable about a vertical axis. The object carrier is driven by a drive unit. The object carrier rotates clockwise or anticlockwise in individual work cycles during the production. The workstations are arranged circumferentially distributed around the object carrier. The objects to be processed are located circumferentially distributed on the object carrier. By rotating the object carrier, the objects can be transported from workstation to workstation. The workstations carry out a work process, which may comprise one or more production steps, on each of the objects. The objects may be arranged on the object carrier in object carrier elements which receive one or more objects. The objects may be products (goods) to be manufactured or workpieces to be machined or test articles.

The known indexing tables have object carriers on which the object carrier elements are arranged immovable relative to one another. They are fixed circumferentially distributed at predetermined distances on the object carrier. In connection with the stationary workstations, the object carrier elements are brought into the appropriate position with respect to the respective workstations merely by rotating the object carrier. The object carrier elements expediently remain there until the workstation has carried out the work process.

A production system generally has workstations having different process times. In this case, the incremental rotation of the object carrier is substantially determined by the duration of the longest process. Because the object carrier is at a standstill during a work process having a long process time, and because of the predetermined distance of the object carrier elements and the incremental rotation of the object carrier through a predetermined angle of rotation, each object requires its own workstation for processing, even for the work processes having short process times. However, these workstations are only made use of briefly, and so the capacity utilisation of these workstations is low. This involves high investments and operating costs, and is inefficient. In addition, the probability of the production system failing increases with the number of workstations. Production systems of this type are distinguished by high complexity and poor accessibility of the components.

If the production method includes work processes having different process times, for the aforementioned reasons the use of a transport device in which the object carrier and the object carrier elements do not form a rigid arrangement is advantageous, in such a way that some object carrier elements can remain at workstations having a long process time whilst other object carrier elements can be transported from workstation to workstation, and the respective work processes can be carried out.

In controlling a transport device, the problem generally occurs that the position of the individual object carrier elements in relation to the stationary workstations has to be known so as to be able to ensure correct allocation of the object carrier elements and the workstations. The known indexing tables therefore have a rotary encoder which detects the rotational position of the turntable. If the rotational position of the object carrier is known, the position of the object carrier elements on the object carrier can be determined. However, this requires the object carrier elements to be rigidly connected to the object carrier in a predetermined arrangement. Otherwise, determining the rotational position of the object carrier would not be sufficient.

The operation of the transportation device requires a setup in which the individual components are moved into a defined base position. In practice, it is important that the transport device can start operation again rapidly even after an incident, for example a power failure or emergency shutdown.

An object of the invention is to provide a transport device for transporting objects from workstation to workstation of a production system which is of a relatively simple construction and makes flexible configuration of the production process possible. A further object of the invention is to provide a production system for manufacturing products which is of a relatively simple construction and makes flexible configuration of the production process possible.

These objects are achieved according to the invention by the features of the independent claims. The dependent claims relate to advantageous embodiments of the invention.

The transport device according to the invention for transporting objects from workstation to workstation in a production system has a stationary assembly, an object carrier rotatable about an axis of rotation in successive work cycles, and a plurality of object carrier elements, arranged circumferentially distributed and movable relative to the object carrier on a circular path, for depositing one or more objects, and a drive unit for driving the object carrier.

The stationary assembly means the stationary part of the transport device. The stationary assembly forms the stator and the object carrier forms the rotor for driving the transport device. Object carrier elements means all elements on which one or more objects can be deposited or arranged. The objects may be positioned loosely on the object carrier elements or be fixed on the object carrier elements.

The transport device according to the invention is distinguished in that the object carrier elements are guided on a circular path displaceably relative to the object carrier. As a result, the object carrier does not form a rigid arrangement together with the object carrier elements. The object carrier elements can be displaced freely with respect to the object carrier, and do not have their own drives. A drive unit is provided for driving the object carrier. The drive unit may for example be an electric motor drive.

The transport device according to the invention is further distinguished in that coupling elements are assigned to the object carrier elements and are rotated together with the object carrier elements. The coupling elements can each take on only a first switching position or a second switching position. In the first switching position, the coupling element is engaged with the stationary assembly and disengaged from the rotatable object carrier, in such a way that the object carrier element assigned to the coupling element remains at a workstation, whilst in the second switching position, the coupling element is disengaged from the stationary assembly and engaged with the rotatable object carrier, in such a way that the object carrier element assigned to the coupling element is moved from workstation to workstation.

Actuating the coupling elements makes possible a movement of an object carrier element for transporting objects to a workstation having a short process time whilst another object carrier element remains at a workstation having a long process time. By controlling the drive unit of the object carrier and actuating the coupling elements, the object carrier elements comprising the objects are positioned in the desired processing position with respect to the respective workstations and can be moved onwards from one workstation to another workstation.

Since the object carrier elements do not have their own drives, the construction of the transport device is simplified. The transport device can be implemented using conventional assemblies. The use of standard machine parts makes the transport device low-maintenance. For individual objects, any desired maintenance zones can be set up, and additional processes, such as cleaning objects, can also easily be integrated into the production process.

In the transport device according to the invention, only one coupling element is provided both for coupling an object carrier element to the object carrier and for coupling the object carrier element to the stationary assembly, and can take on only two defined switching positions, in other words coupling the object carrier element to the object carrier or to the stationary assembly. Even if only one coupling element is mentioned in this context, this may also refer to coupling elements consisting of a plurality of individual parts.

A preferred embodiment provides that a predetermined number of recesses arranged circumferentially distributed are provided on the stationary assembly for coupling and uncoupling the object carrier elements to and from the stationary assembly, and a predetermined number of recesses are provided on the object carrier for coupling and uncoupling the object carrier elements to and from the rotatable object carrier. The number of recesses in the stationary assembly may correspond to the number of recesses in the object carrier, the number of recesses in the stationary assembly and object carrier determining the number of positions which can be taken on by the object carrier element.

In a preferred embodiment, the coupling element comprises a first engagement element which engages in one of the recesses of the stationary assembly in the first switching position, and the coupling element comprises a second engagement element which engages in one of the recesses of the object carrier in the second switching position. The first and second engagement elements are rigidly interconnected, in such a way that the two engagement elements can be moved into the two positions using just one actuator.

A particularly preferred embodiment provides that the recesses of the stationary assembly have radially inward-facing openings, and the recesses of the object carrier have radially outward-facing openings, the first and second engagement elements being guided displaceably in a radial direction in such a way that in the first switching position, the first engagement element engages in one of the recesses of the stationary assembly and in the second switching position, the second engagement element engages in one of the recesses of the object carrier. The recesses may be formed differently, for example having a rectangular or circular cross section. They may also be open on different faces. In this embodiment, switching may take place in that the coupling element is slid backwards or forwards on a horizontal axis by the actuator. This embodiment is of a particularly simple construction. However it is also possible in principle for the engagement elements to engage in upwardly or downwardly open recesses from above or below.

The coupling elements are preferably guided longitudinally displaceably on guide elements, the actuators for moving the coupling elements being piston/cylinder arrangements to which a pressurising medium, in particular pressurised air, can be applied in such a way that the coupling elements can be moved between the first and the second switching positions. However, an electromagnetic actuating drive is also possible. The pressurising medium supply or electrical power supply may be provided via pressure lines or electrical lines which are passed to a pressurising medium source or power source via a rotary feedthrough.

In an embodiment distinguished by a particularly simple construction, the piston/cylinder arrangements are double-action piston/cylinder arrangements comprising two opposing piston faces to which a pressurising medium can be applied in such a way that the coupling element can be moved in opposing directions.

The object carrier elements are guided freely movably relative to the object carrier in a guide path, in such a way that they can be held in place in relation to a stationary reference system. The guide path may be formed in various ways. All that is important is that the object carrier elements can be moved on the circular path.

For receiving the objects, the object carrier elements preferably have receiving elements in or on which the objects can be placed. The objects are thus sufficiently fixed to the object carrier elements.

So as to be able to displace the object carrier elements relative to the object carrier, in an embodiment no object carrier element is arranged on one portion of the circular path, and an object carrier element is arranged on each of the other portions of the circular path. However, it is also possible for there to be no object carrier elements arranged on a plurality of portions of the circular path.

The coupling elements, which can each take on only one of the two switching positions, have the advantage that an operating state in which an object carrier element is engaged with both the object carrier and the stationary assembly cannot occur. This reduces the risk of a collision.

A further advantage is that a loss of the segment coupling cannot occur, since only one of the two switching positions can be taken on. As a result, the object carrier element is always in a defined position in relation to a stationary reference system or the workstations surrounding the object carrier elements. If the object carrier element were not fixed in at least one of the two positions by the coupling element, the object carrier element could take on any intermediate position.

This advantage comes to bear in particular if, after an incident, for example a power failure or an emergency shutdown, the transport device needs to be set up afresh so as to start operation again. After a current failure, for example, all position data are lost. It is therefore necessary to redetermine the position of the individual object carrier elements. However, since the object carrier elements are movable with respect to the object carrier rather than being rigidly connected to the object carrier, determining the rotational position of the object carrier is not sufficient for determining the positions of the object carrier elements. Although it would be possible to determine the positions of the object carrier elements in relation to the stationary assembly or the workstations using suitable analogue detectors, integrating a sensor system of this type and capturing and evaluating the data would be relatively complex. By contrast, the forced coupling according to the invention by means of the coupling elements makes it possible to determine the positions of the object carrier elements in a relatively simple manner.

A preferred embodiment of the device for determining the positions of the object carrier elements comprises position sensors which are arranged circumferentially distributed and assigned to the individual object carrier elements. The position sensors, which may be arranged below the object carrier elements on the stationary assembly, are formed in such a way that they generate a position signal when an object carrier element on the object carrier is located in a position assigned to the respective sensor or no object carrier element is located in a position assigned to the respective sensor.

In a particularly preferred embodiment, the position sensors are inductive sensors, a marking element detectable by the inductive sensor being arranged on the object carrier element. The position sensors may also be optical sensors, which can detect a marking element by shape and/or colour, or may also be tactile sensors.

The device for determining the position of the object carrier elements has an evaluation unit which is formed in such a way that a data set describing the position of the object carrier elements is generated. On the basis of this data set, the control unit can carry out setup of the system for example after a power failure where all position data have been lost.

When determining the positions, it should be taken into account that the order of the object carrier elements is fixed. However, there is not an object carrier element in each circle segment, in other words there may be a gap between consecutive object carrier elements.

Evaluating the position signals of the position sensors makes it possible to determine the position of the object carrier elements, in particular to determine the position of the gap between consecutive object carrier elements. The signal evaluation is found to be particularly simple, since only two possible signal states need to be evaluated. However, evaluating the position signals still gives no indication as to where the first object carrier element in the series of object carrier elements is located. Therefore, a further preferred embodiment provides an input unit for inputting the position of one of the object carrier elements, in particular for inputting the position of the first object carrier element in relation to a stationary reference system. It is also possible to input a different object carrier element, since the order of the object carrier elements and the position of the gap are known, and so the position of the first object carrier element can also be determined from the position of another object carrier element. For example, the position of the first object carrier element in relation to one of the stationary workstations may be inputted.

In a particularly preferred embodiment, the evaluation unit of the device evaluates the position signal of the position sensors to determine the arrangement of the object carrier elements, a data set describing the position of the object carrier elements in relation to a stationary reference system being generated on the basis of the inputted position of one of the object carrier elements. This data set can subsequently be used for setting up the system. In this context, a data set means all the data or signals describing the arrangement or position of the object carrier elements.

The device for determining the position of the object carrier elements is preferably connected via a data line to a control device for the drive unit of the object carrier, in such a way that the drive unit of the object carrier can be controlled on the basis of the determined data set.

The production system according to the invention for manufacturing products has one or more of the transport devices according to the invention. A plurality of workstations may be arranged along the movement path of the transport device. Each workstation may be provided for carrying out a work process comprising at least one work step. The incomplete list of possible examples of work steps may include: manipulating, supplying, removing, mechanically processing, thermally processing, filling, cleaning, positioning, equipping, weighing, marking. The workstations may carry out a work process on one object or a plurality of objects simultaneously.

In a particularly preferred embodiment, the transport device according to the invention is used in a production system for manufacturing containers filled with a medical product, in particular a drug, in particular for manufacturing medical solution bags, for example solution bags for peritoneal dialysis or acute haemodialysis or infusion technology. Solution bags of this type are manufactured by providing bag blanks with a connector, for example what is known as a boat-type connector, and filling the bags provided with the connector with a solution. In this case, the production step of filling the bag with the solution is the step having the longest processing time. The filling process step is limited by the diameter of a filling nozzle used for the filling and by the internal pressure of the solution.

Figure 2:
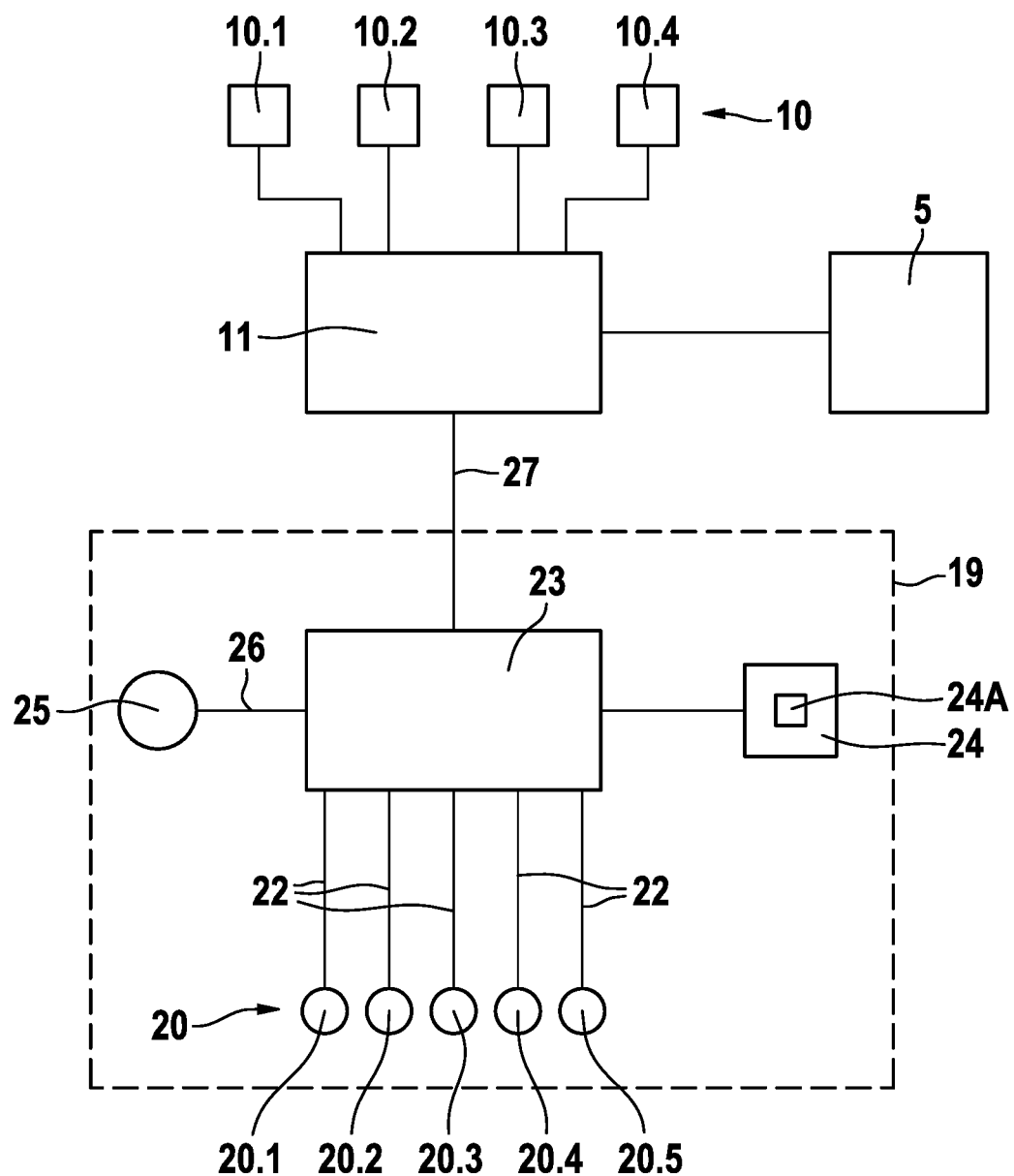
Figure 3:
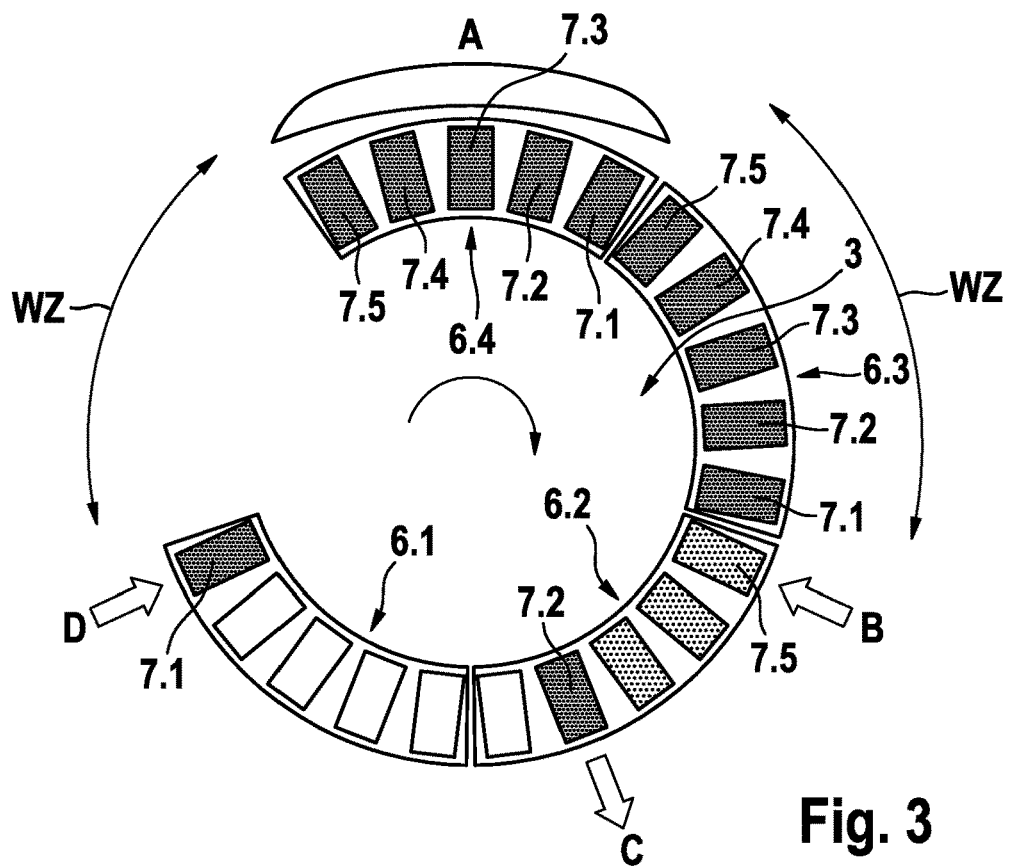
Figure 4:
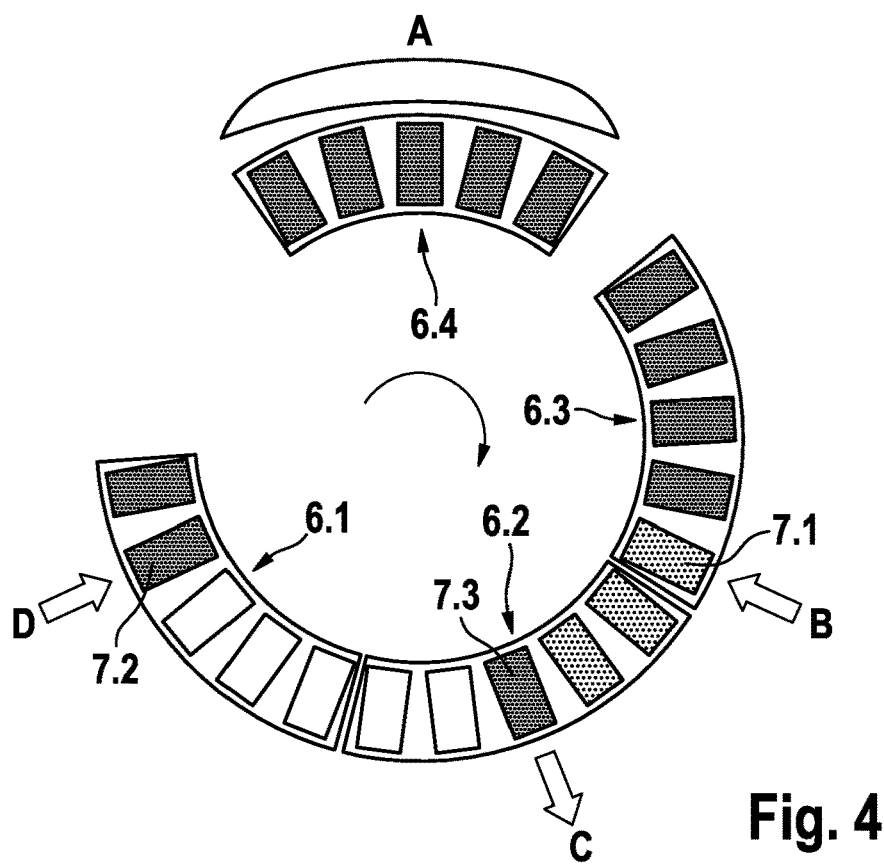
Figure 5:
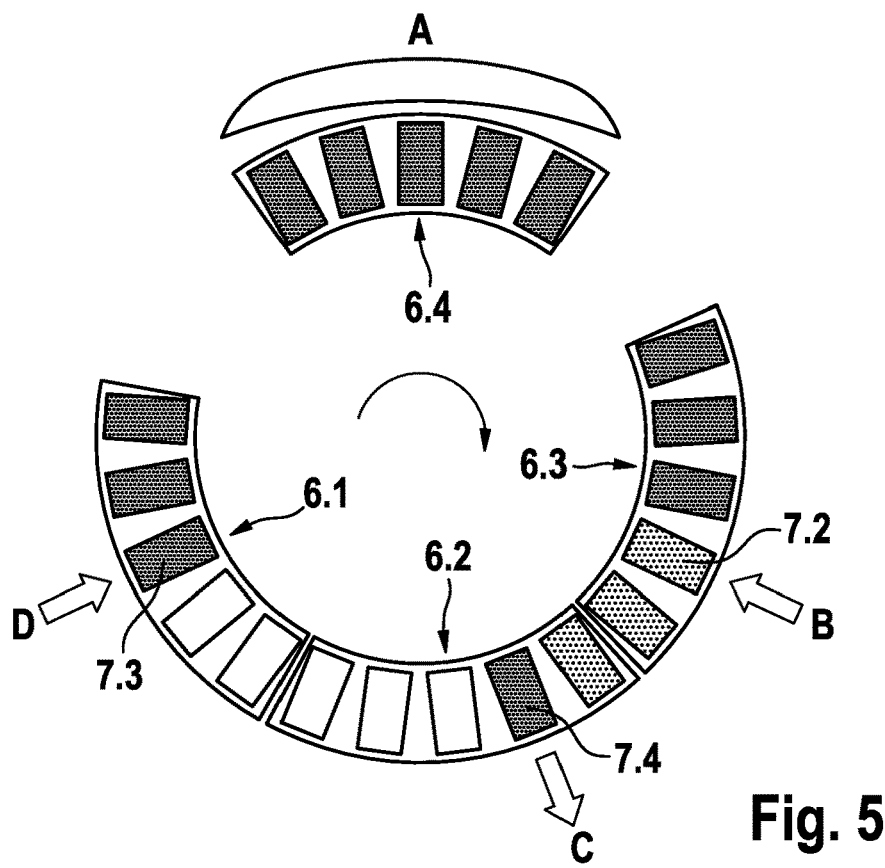
Figure 6:
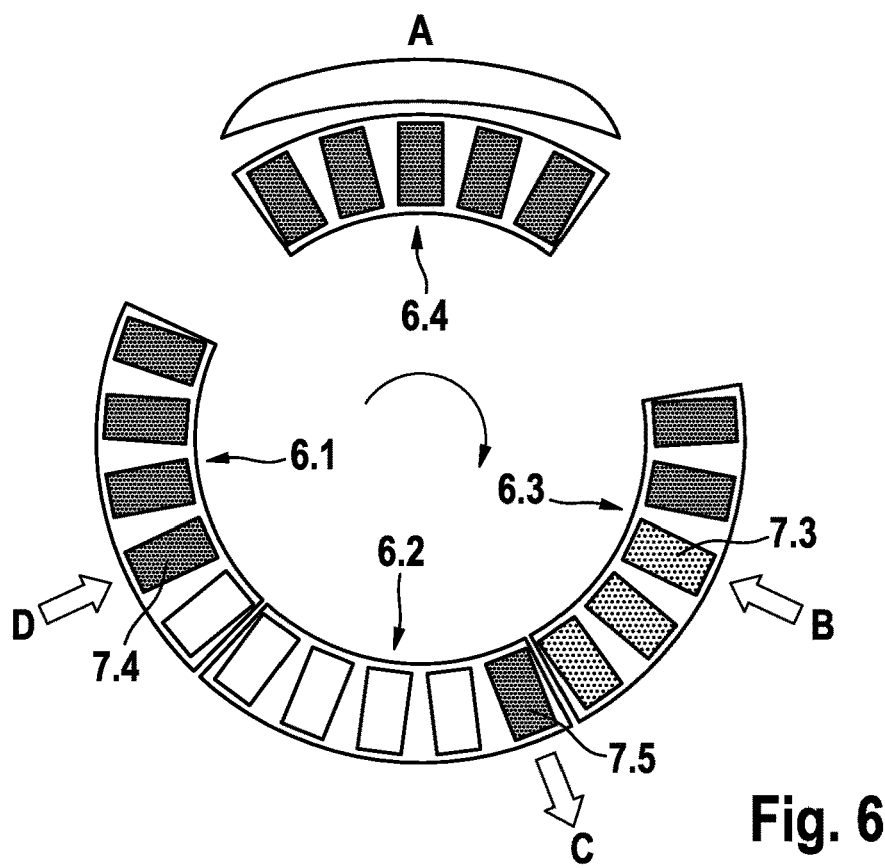
Figure 7:
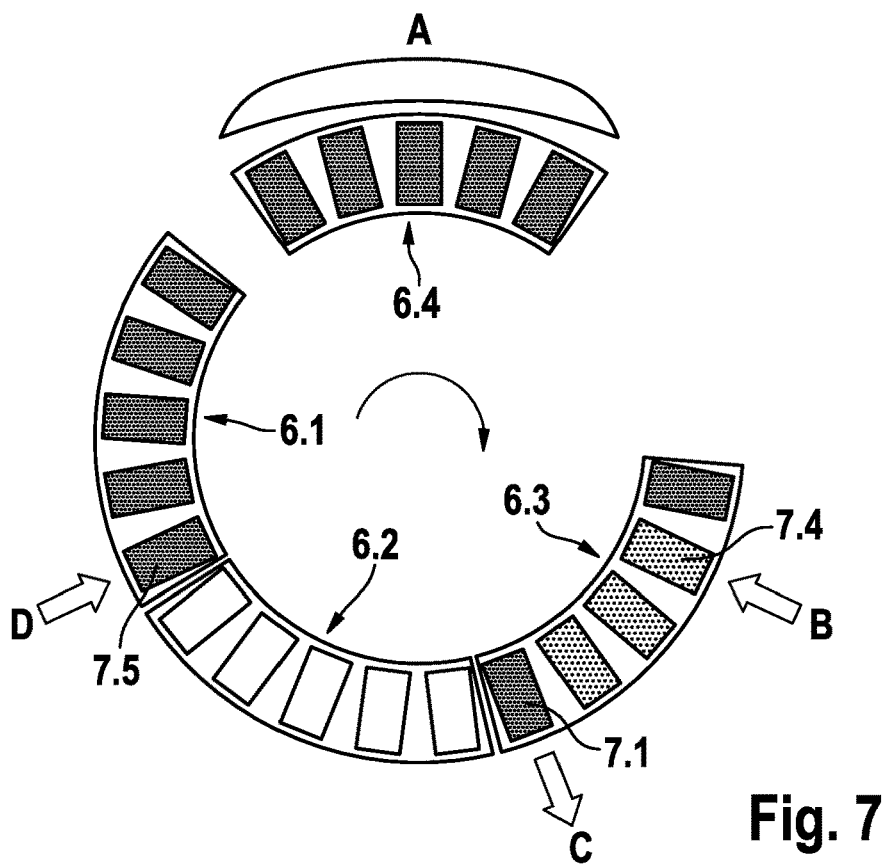
Figure 8:
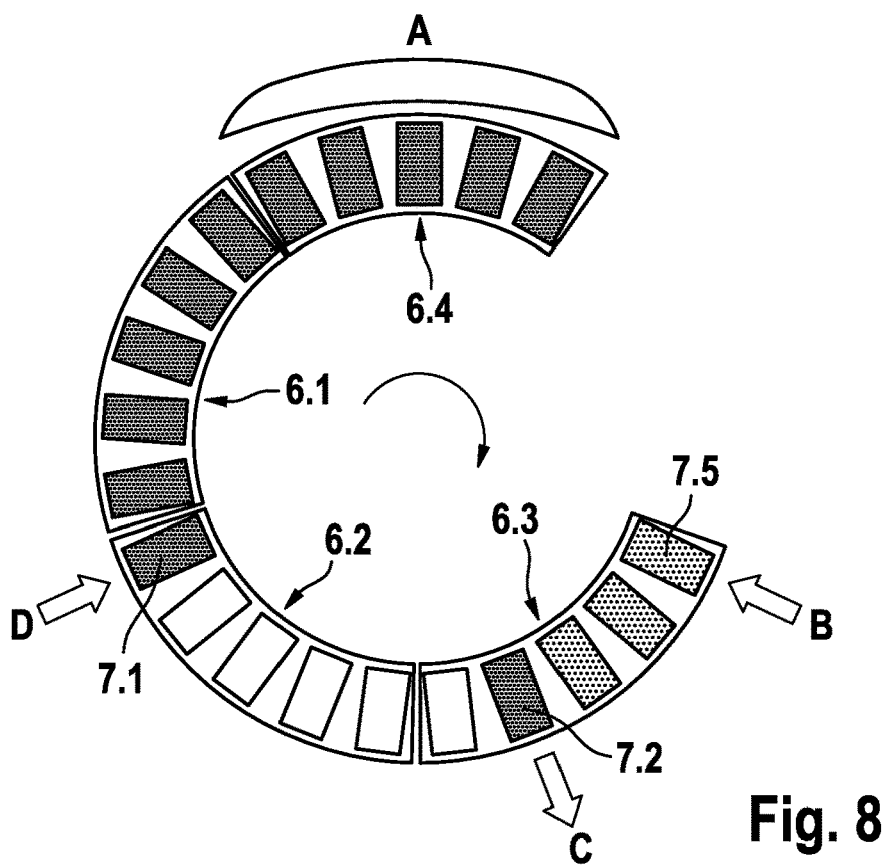
Figure 9:
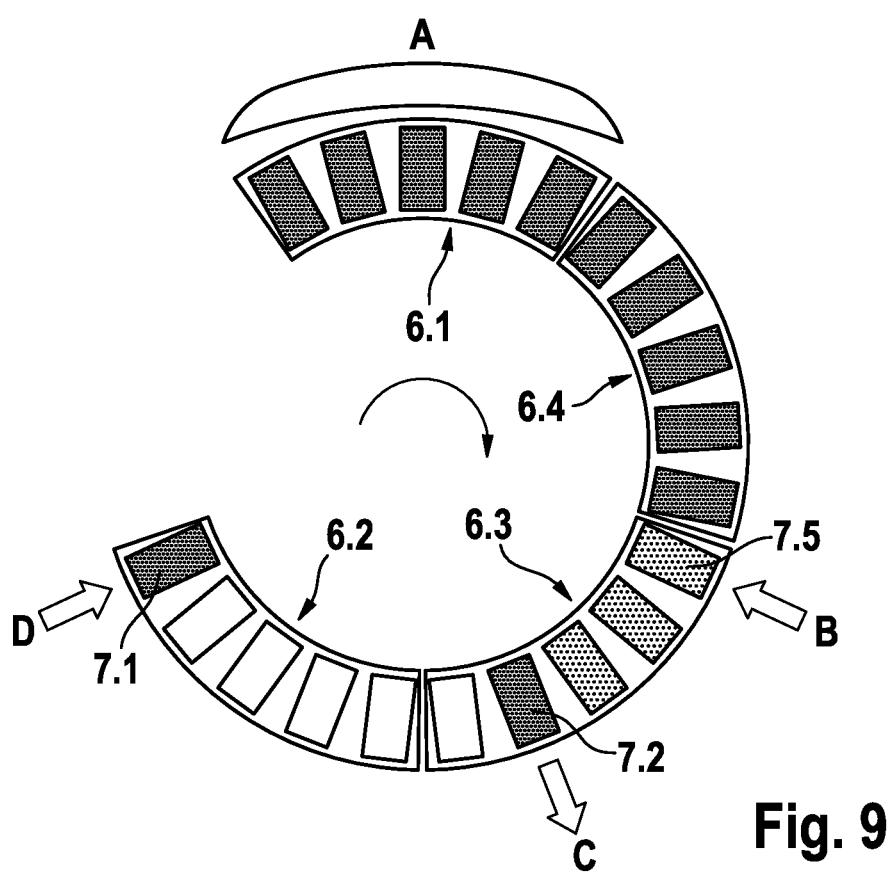
Figure 10:
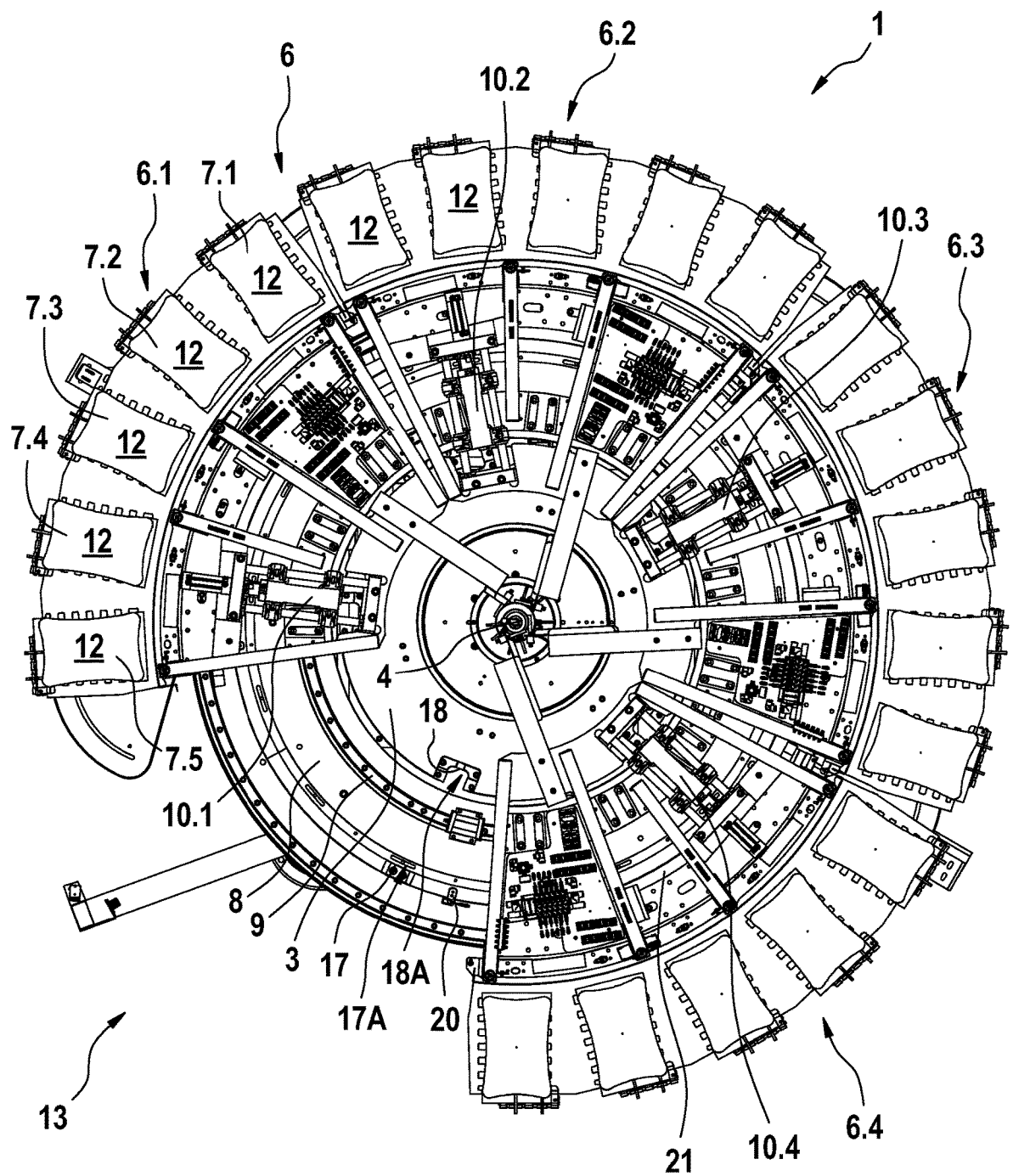
Figure 11:
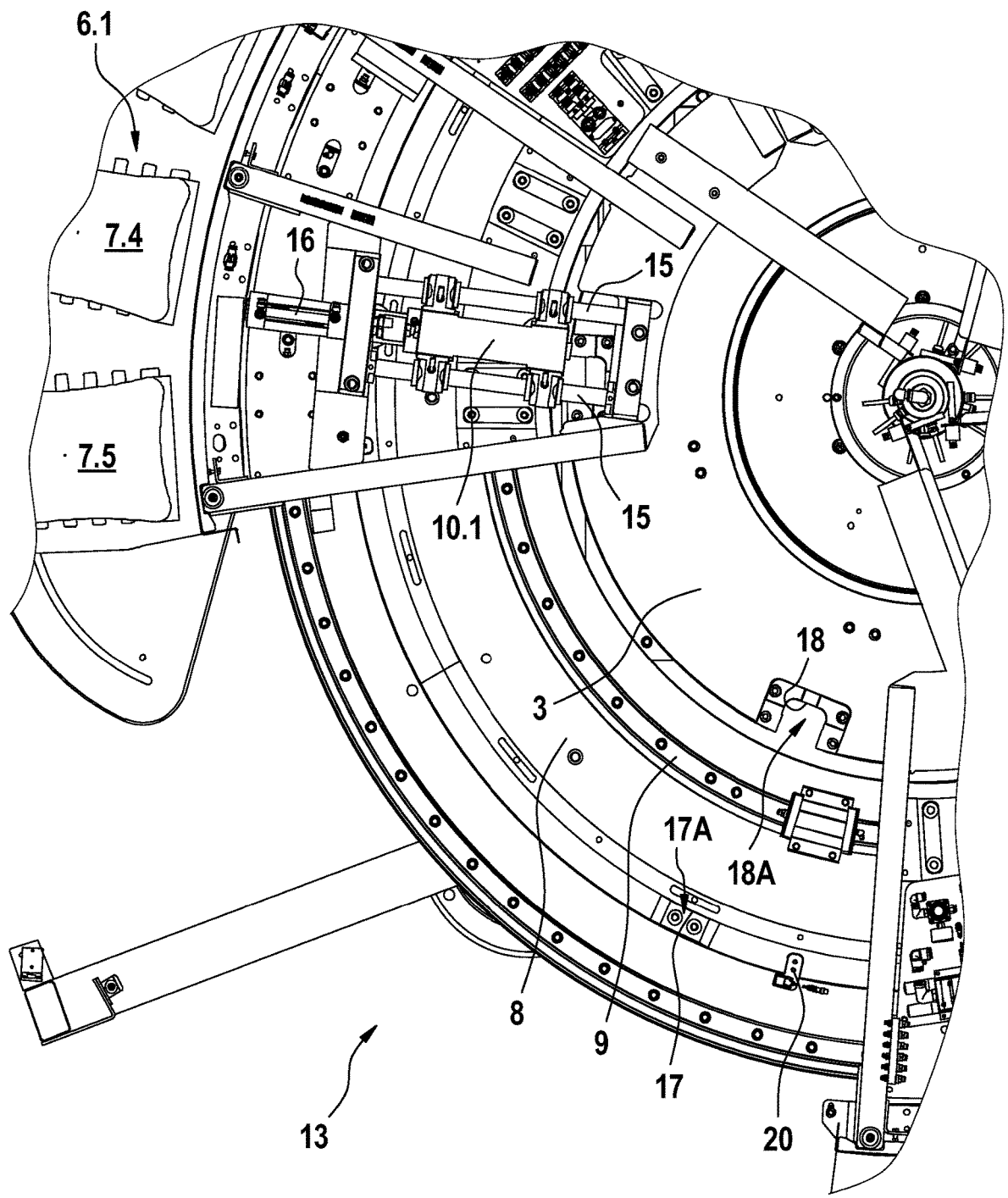
Figure 12:
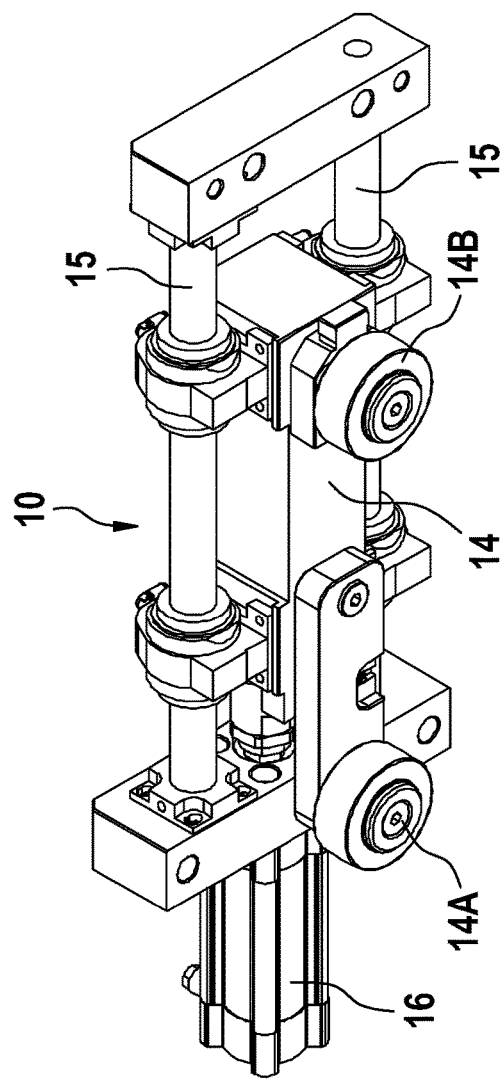
Figure 13:
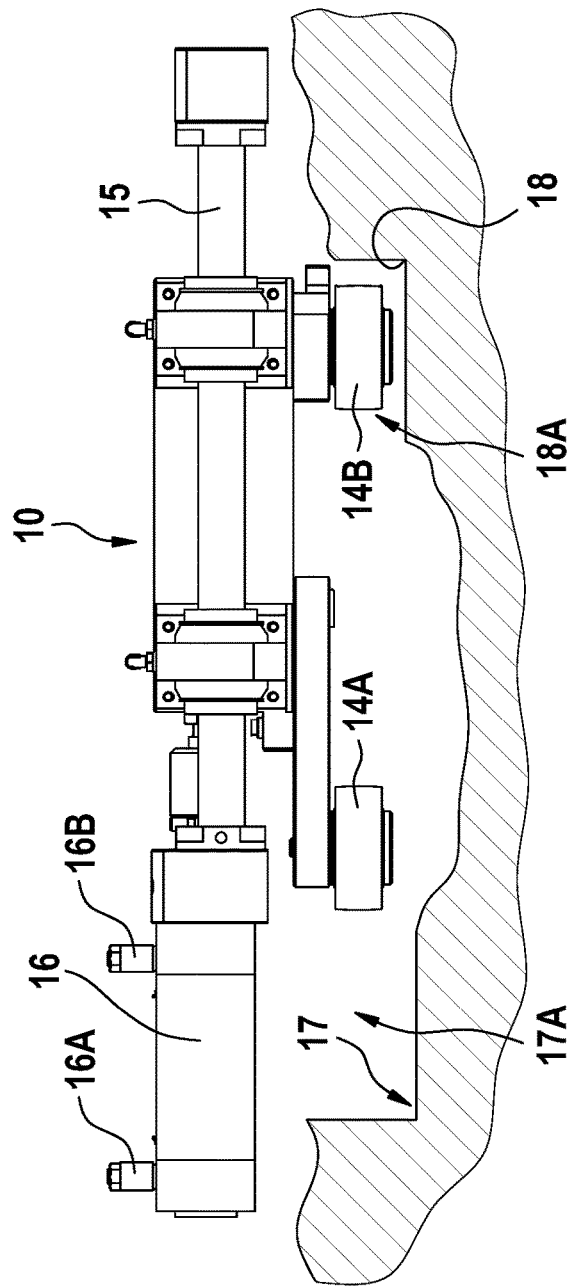

In the following, an embodiment of the invention is described in greater detail with reference to the drawings, in which:

FIG. 1 is a highly simplified schematic drawing of the transport device according to the invention, FIG. 2 is a block diagram of the transport device, FIG. 3 is a schematic plan view of the first work step in the method of manufacture, FIG. 4 is a schematic plan view of the second work step in the method of manufacture, FIG. 5 is a schematic plan view of the third work step in the method, FIG. 6 is a schematic plan view of the fourth work step in the method, FIG. 7 is a schematic plan view of the fifth work step in the method, FIG. 8 is a schematic plan view of a short work cycle of the sixth work step of the method, FIG. 9 is a schematic plan view of a long work cycle of the sixth work step of the method, FIG. 10 is a plan view of an embodiment of the transport device according to the invention, FIG. 11 is an enlarged partial view of the transport device from FIG. 10, FIG. 12 is a perspective drawing of a switching device of an object carrier element of the transport device, FIG. 13 is a side view of the switching device of an object carrier element, FIG. 1 is a schematic drawing of the transport device according to the invention, merely for illustrating the operating principle of the transport device. FIG. 2 is a block diagram of the transport device.

The transport device 1, in the form of an indexing table, comprises a stationary assembly 2 (stator), which receives an object carrier 3 which can be driven in rotation about a vertical axis of rotation 4 by a drive unit 5 (FIG. 2) (not shown in FIG. 1). In FIG. 1, the axis of rotation of the object carrier 3 is perpendicular to the plane of the drawing. The drive unit 5 rotates the object carrier 3 incrementally through fixedly predetermined angles in successive work cycles.

A plurality of object carrier elements 6 are assigned to the object carrier 3. In the present embodiment, four object carrier elements 6.1, 6.2, 6.3, 6.4 are assigned to the object carrier 3. The object carrier elements 6 each have a plurality of receiving elements 7. In the present embodiment, the object carrier elements 6 each have five receiving elements 7.1, 7.2, 7.3, 7.4, 7.5. Each receiving element can receive an object. However, it is also possible for each object carrier element 6 to have just one receiving element, it also even being possible for a receiving element 7 to receive a plurality of objects. The receiving elements may be for example bowls, stands, holders or the like.

The object carrier elements 6 arranged circumferentially distributed each describe the shape of a circle segment. The object carrier elements 6 are guided displaceably on a circular movement path in a guide 9 (shown only schematically). They could therefore move relative to the object carrier if they were not coupled to the object carrier or to the stationary assembly.

In the present embodiment, the individual object carrier elements 6 each have a circumferential angle of 360°/5=72°. Since only four object carrier elements 6.1, 6.2, 6.3, 6.4 are provided, a portion of the circular path 8 is left free. This free space (gap) makes it possible to displace the object carrier elements 6 relative to the object carrier 3 without the object carrier elements colliding. The number of object carrier elements 6 and the circumferential angle of the object carrier elements 6 are dependent on the arrangement and number of workstations.

The transport device 1 is part of a production system which has a plurality of workstations which are arranged circumferentially distributed about the object carrier 3 of the transport device 1. The workstations are not shown in FIG. 1. In the present embodiment, four workstations are provided.

A switching device 10 (not shown in FIG. 1) is assigned to each of the object carrier elements 6, and rotates with the object carrier element. The switching devices 10 are described in greater detail with reference to FIGS. 12 and 13. In the present embodiment, four switching devices 10.1, 10.2, 10.3, 10.4 are provided (FIG. 2).

The switching devices 10 are formed in such a way that the individual object carrier elements 6 can be coupled either to the rotating object carriers 3 or to the stationary assembly 2. The switching devices 10 make only two switching positions possible. When an object carrier element 6 is coupled to the stationary assembly 2, the object carrier element 6 is not entrained by the object carrier 3, and so the object carrier element 6 maintains the position thereof. This is referred to as the first switching position. By contrast, when an object carrier element 6 is coupled to the object carrier 3, the object carrier element 6 is entrained by the object carrier 3. This is referred to as the second switching position Further, the transport device 1 has a control device 11 (FIG. 2) for the drive unit 5 and the switching devices 10. The control device 11 is configured in such a way that the drive unit 5 and the switching devices 10 are actuated for carrying out the individual work steps.

FIG. 3 to 9 show the individual work steps of a method for manufacturing a product. In the present embodiment, the method of manufacture is a method for manufacturing containers filled with a medical product, in particular bags filled with a medical solution, in particular film bags for peritoneal dialysis. FIG. 3 to 9 serve merely to illustrate the basic principle of the method. Therefore, not all method steps required for manufacturing the products are shown.

The production system comprises at least one of the transport devices 1 described with reference to FIG. 1. FIG. 3 is a schematic drawing of merely the four object carrier elements 6.1, 6.2, 6.3, 6.4 of the transport device (indexing table). In the present embodiment, the production system comprises four workstations A, B, C, D (merely indicated in the drawing), which are arranged circumferentially distributed about the object carrier 3. The containers, in particular film bags, are provided as blanks, which have not been provided with a connector, in particular a weld boat, and have not been filled with the medical product, in particular a liquid, for example a solution for peritoneal dialysis. The workstation A is a filling station by means of which the bags provided with the connector are filled. Filling the bags is a work process having a long process time. The process time is much longer than the process times of the other workstations. The workstation B having a short process time is a workstation by means of which the bag blanks are equipped with the connectors. The workstation C is a workstation for removing the bags which have been provided with the connector and filled, and the workstation D is a workstation for setting down the bag blanks. The workstations B, C and D have a process time which is shorter than the process time of the workstation A.

The drive unit 5 rotates the object carrier 3 clockwise incrementally in successive short or long work cycles. In the present embodiment, the object carrier 3 is rotated 14.4° clockwise in a short work cycle (360°/5 (5 carrier elements)/5 (5 receiving elements 7.1, 7.2, 7.3, 7.4, 7.5 per carrier element)=14.4°). The switching devices 10 are not shown in FIG. 3 to 9.

The described method is distinguished by a combination of individual cycles for the workstations B, C, D having a short process time and multiple cycles for the workstation A having a long process time. For this purpose, it is necessary to compensate the individual cycles before the workstation A having a long process time and to compensate the multiple cycle after the workstation A having a long process time. The individual cycles and the multiple cycle are compensated in waiting zones WZ upstream and downstream in the direction of rotation (clockwise) from the workstation A having a long process time. The individual work steps are described in the following.

FIG. 3 shows the first work step (initial position). The four object carrier elements 6.1, 6.2, 6.3, 6.4 are arranged in such a way that in the first work step, there is no object carrier element in the waiting zone WZ upstream from the workstation A having a long process time. The bag blanks are located in the receiving elements 7.1, 7.2, 7.3, 7.4, 7.5 of the third and fourth object carrier elements 6.3, 6.4. The waiting zone WZ upstream from the workstation A having a long process time is empty, and the waiting zone WZ downstream from workstation A is full. The workstation A for the filling process having the long process time and the workstations B, C, D for the work processes having the short work times are operational. The workstation B equips the filled bag located in the fifth receiving element 7.5 of the second object carrier element 6.2 with a connector, for example a cap. The workstation C removes the finished bags located in the second receiving element 7.2 of the second object carrier element 6.2, which have been provided with the connector and filled with the solution, and the workstation D equips the first receiving element 7.1 of the first object carrier element 6.1 with a bag blank.

FIG. 4 shows the second work step. The control device 11 controls the switching devices 10 in such a way that the switching devices 10.1, 10.2, 10.3 assigned to the first, second and third object carrier element 6.1, 6.2, 6.3 are switched into the second switching position whilst the switching device 10.4 assigned to the fourth object carrier element 6.4 is switched into the first switching position. As a result, the first, second and third object carrier elements 6.1, 6.2, 6.3 are entrained in a clockwise rotation of the object carrier 3, and the fourth object carrier element 6.4 is locked. Once the object carrier 3 has rotated through a predetermined angle of rotation (360°/(5×5)=14.4°), the waiting zone WZ upstream from the long process is equipped with a single bag blank, and the waiting zone WZ downstream from the long process is occupied by four filled bags. The workstation B equips the filled bag located in the first receiving element 7.1 of the third object carrier element 6.3 with a connector. The workstation C removes the finished bag located in the third receiving element 7.3 of the second object carrier element 6.2, which has been provided with the connector and filled with the solution, and the workstation D equips the second receiving element 7.2 of the first object carrier element 6.1 with a bag blank.

In the third work step (FIG. 5), the control device again actuates the switching devices 10 in such a way that the first, second and third object carrier elements 6.1, 6.2, 6.3 are entrained, and the fourth object carrier element 6.4 is held in place. The object carrier 3 again rotates through a predetermined angle of rotation (14.4°). After the object carrier 3 rotates, the waiting zone WZ upstream from the long process is equipped with two bag blanks, and the waiting zone downstream from the long process is occupied by three filled bags. The workstation B now equips the filled bag located in the second receiving element 7.2 of the third object carrier element 6.3 with a connector. The workstation C removes the finished bag from the fourth receiving element 7.4 of the second object carrier element 6.2, and the workstation D equips the third receiving element 7.3 of the first object carrier element 6.1 with a bag blank.

In the fourth work step (FIG. 6), the first, second and third object carrier elements 6.1, 6.2, 6.3 are again entrained whilst the fourth object carrier element 6.4 is held in place. After the object carrier element is rotated through the predetermined angle of rotation (14.4°), the waiting zone WZ upstream from the long process is equipped with three bag blanks, and the waiting zone WZ downstream from the long process is occupied by two filled bags. The workstation B equips the filled bag located in the third receiving element 7.3 of the third object carrier element 6.3 with a connector, the workstation B removes the finished bag from the fifth receiving element 7.5 of the second object carrier element 6.2, and the workstation D equips the fourth receiving element 7.4 of the first object carrier element 6.1 with a bag blank.

In the fifth work step (FIG. 7), the first, second and third object carrier elements 6.1, 6.2, 6.3 are entrained, whilst the fourth object carrier element 6.4 is held in place. After the object carrier 3 has rotated through the predetermined angle of rotation (14.4°), the waiting zone WZ upstream from the long process is equipped with four bag blanks, and the waiting zone WZ downstream from the long process is occupied by a single filled bag. The filled bag located in the fourth receiving element 7.4 of the third object carrier element 6.3 is equipped with the connector, the finished bag located in the first receiving element 7.1 of the third object carrier element 6.3 is removed, and the fifth receiving element 7.5 of the first object carrier element 6.1 is equipped with a bag blank.

Now the sixth work step follows, comprising a short cycle (FIG. 8), in which the object carrier is rotated through an angle of rotation of 14.4°, and a long cycle (FIG. 9), in which the object carrier 3 is rotated through an angle of rotation of 72° (5×14.4°=72°). In the short cycle, the first, second and third object carrier elements 6.1, 6.2, 6.3 are entrained, and the fourth object carrier element 6.4 is held in place. After the object carrier has rotated through 14.4° (short cycle), the waiting zone WZ upstream from the long process is full, and the waiting zone WZ downstream from the long process is empty. The filled bag located in the fifth receiving element 7.5 of the third object receiving element 6.3 is equipped with a connector, the finished bag is removed from the second receiving element 7.2 of the third object carrier element 6.1, and the first receiving element 7.1 of the second object carrier element 6.2 is equipped with a bag blank.

In the long cycle (FIG. 9), following the short cycle, of the sixth work step, the control unit 11 controls the switching device 10 in such a way that the first and fourth object carrier elements 6.1, 6.4 are entrained, and the second and third object carrier elements 6.2, 6.3 are held in place. The object carrier 3 rotates through 72° (5×14.4°=72°) in the long cycle. After the object carrier 3 is rotated, the waiting zone WZ upstream from the long process is empty, and the waiting zone WZ downstream from the long process is full, and so the first work step (FIG. 3) can follow again.

In the sixth work step, the total of the cycle time of the short cycle $t_{TK}$ and the cycle time of the long cycle $t_{TL}$ is less than the total process time of the short cycle $t_{GK}$ ($t_{TK}+t_{TL}<t_{GK}$).

The above-described process corresponds to a 5-fold parallel connection of the longest process.

In the configuration of the production system, the following principles apply:

$t_{PK}$ process time of short process
$t_{PL}$ process time of long process
$t_{TK}$ cycle time of short cycle
$t_{TL}$ cycle time of long cycle
$t_{GK}$ total process time of short cycle
$t_{GL}$ total process time of long cycle
S scaling factor
WZ waiting zone
$A_{OTE}$ number of object carrier elements
$A_{WZ}$ number of waiting zones
LP process having long process time
KP process having short process time
Total process time of short cycle:

$$t_{GK}=t_{PK}+t_{TK}$$

Short and long cycle must be within the cycle time of the short cycle:

$$t_{TK}t_{TL}<t_{GK}$$

Total process time of long cycle:

$$t_{GL}=t_{PL}+t_{TLK}$$

Calculation of the required multiplication of the longest process step:

$$t_{GL}/t_{GK}=S$$

Depending on the finding as to which system part is to be the bottleneck of the system as a whole, S has to be rounded up or down.

Number of coupled object carriers per circle segment $$S \times \text{object carriers} = \text{object carrier elements}$$

Number of object carrier elements per system:

$$A_{OTE} \geq 2(1 \times \text{short process}, 1 \times \text{long process})$$

Number of WZ per system:

$$A_{WZ} \geq 2(\text{WZ required for each change from short process to long process, WZ required for each change from long process to short process})$$

FIG. 10 is a plan view of an embodiment of the transport device 1 according to the invention, whilst FIG. 11 is an enlarged partial view of FIG. 10. FIGS. 12 and 13 are a perspective drawing and a side view of the switching device 10. The individual components of the transport device 1 are denoted by the same reference numerals in FIG. 10 to 13 as in FIG. 1 to 9. The transport device shown in FIG. 10 to 13 is of the same construction as the transport device described with reference to FIG. 1 to 9. In the following, only the components of the transport device of relevance to the invention are described.

The object carrier elements 6.1, 6.2, 6.3, 6.4, which are guided in a guide 9, can be seen in FIG. 10. There is a bag 12 in each of the receiving elements 7.1, 7.2, 7.3, 7.4, 7.5 of the object carrier elements 6.1, 6.2, 6.3, 6.4. A switching device 10.1, 10.2, 10.3, 10.4 is assigned to each object carrier element 6.1, 6.2, 6.3, 6.4, and is fixed to the object carrier element.

If the object carrier elements 6.1, 6.2, 6.3, 6.4 were not coupled to the stationary assembly 2 or the object carrier 3, they could move freely on a circular path 8 in the guide 9. The object carrier elements 6.1, 6.2, 6.3, 6.4 and the object carrier 3 may consist of a plurality of parts. What is important is that the object carrier 3 rotates with respect to the stationary assembly, and the object carrier elements 6.1, 6.2, 6.3, 6.4 could move freely relative to the stationary assembly 2 or the object carrier 3 if they were not coupled to the stationary assembly 2 or the object carrier 3 by the switching device 10.1, 10.2, 10.3, 10.4. The object carrier elements 6.1, 6.2, 6.3, 6.4 can enclose the object carrier 3 circumferentially.

The object carrier elements 6.1, 6.2, 6.3, 6.4 form a series, there being a gap 13 between the first and the fourth object carrier element 6.1, 6.4 in the position shown in FIG. 10. The object carrier elements 6.1, 6.2, 6.3, 6.4 can take on five different positions in the present embodiment.

The switching device 10 comprises a coupling element 14 consisting of a plurality of parts, which is guided longitudinally displaceably on guide elements 15. The guide elements 15 may be guide carriages. Linear guides of this type are found in the prior art. The coupling element 14 has a first engagement element 14A and a second engagement element 14B which are arranged at a distance from one another on a shared longitudinal axis. The engagement elements 14A, 14B may have a circular cross section. They may be bearings having an inner and outer ring, for example roller bearings.

To displace the coupling element 14 on a longitudinal axis, an actuator 16 is provided, which in the present embodiment is a double-action piston/cylinder arrangement. An application of pressure to one piston face leads to a movement in one direction, and an application of pressure to the other piston face leads to a movement in the other direction. The pressurising medium is supplied to the piston/cylinder arrangement at the terminals 16A, 16B via supply lines (not shown).

A number of recesses 17 corresponding to the number of positions are assigned to the first engagement element 14A, and are arranged circumferentially distributed at uniform distances on the stationary assembly 2. These recesses 17 comprise openings 17A facing radially inwards with respect to the axis of rotation. A number of recesses 18 corresponding to the number of positions are also assigned to the second engagement element 14B, and are arranged circumferentially distributed at uniform distances on the object carrier 3. These recesses 18 have radially outward-facing openings 18A. In the present embodiment, five recesses 17 or 18 are provided in each case.

FIGS. 10 and 11 show a recess 17 on part of the object carrier 3 and a recess 18 on part of the stationary assembly 2 for the five positions by way of example. The recesses 17, 18 may be formed differently. They may be for example pockets delimited by side walls. The pockets need not be closed at the upper face and lower face.

In the first switching position, the first engagement element 14A engages in a recess 17 of the stationary assembly 2, whilst in the second switching position, the second engagement element 14B engages in a recess 18 of the object carrier 3. The distance between the engagement elements 14A, 14B is such that only one of the two engagement elements is ever engaged with one of the recesses 17, 18. As a result, the relevant object carrier element 6.1, 6.2, 6.3, 6.4 is either entrained by the object carrier 3 or locked on the stationary assembly 2. The coupling may only take place in one of the five positions established by the arrangement of the recesses. As a result, positions in which the object carrier elements 6.1, 6.2, 6.3 can be located in relation to the object carrier 3 are also established. The object carrier elements cannot take on undefined intermediate positions.

The control device 11 actuates the piston/cylinder arrangements of the switching devices 10 in such a way that the object carrier elements 6.1, 6.2, 6.3, 6.4 are moved into the individual positions for carrying out the individual method steps (FIG. 3 to 9).

The transport device 1 further has a device 19 for determining the position of the object carrier elements 6.1, 6.2, 6.3, 6.4. As a result of the forced coupling of the object carrier elements 6.1, 6.2, 6.3 either to the stationary assembly 2 or to the object carrier 3, the device 19 for determining the position of the object carrier elements may be of a particularly simple construction. The positions can be determined on the basis of evaluating just two states in each case.

The device 19 for determining the position of the object carrier elements 6 has a number of position sensors 20, 20.1, 20.2, 20.3, 20.4, 20.5 corresponding to the number of positions, arranged circumferentially distributed at uniform distances below the object carrier elements 6 on the stationary assembly 2. FIGS. 11 and 12 show a sensor 20 for the five positions by way of example. A marking element 21 is arranged on each of the object carrier elements 6. FIG. 10 merely indicates the position of the marking element 21 of an object carrier element 6.

The position sensors 20 are connected via signal lines 22 to an evaluation unit 23 of the device 19 for determining the position of the object carrier elements. The position sensors 20 may be inductive sensors, and the marking elements 21 may be metal bodies which are detected by the position sensors. If the position sensors detect a marking element, they generate a position signal which is received by the evaluation unit 23 via the signal line 22.

Further, the device 19 for determining the position of the object carrier elements has an input unit 24, which may for example have a keypad 24A. Using the input unit 24, the operator can input the position of the first object carrier element 6.1 in relation to a workstation A, B, C, D (FIG. 3 to 9) assigned to the object carrier element.

The rotational position of the object carrier 3 is detected using a rotary encoder 25, which is connected to the evaluation unit 23 via a signal line 26. The rotary encoder 25 generates a rotational position signal, which is received by the evaluation unit 23, according to the rotational position of the object carrier 3.

After a power failure, for example, the system has to be set up afresh, since all position data have been lost. For this purpose, the device 19 for determining the position of the object carrier elements 6 provides the control unit 11 with a data set, which the control unit 11 receives via a data line 27. On the basis of this data set, the control unit 11 can set up the system.

The order of the object carrier elements 6 cannot change. To this extent, the system is determined. However, it is not known where the first object carrier element 6.1 is located and where the gap 13 between the object carrier elements is positioned. If the position of the first object carrier element 6.1 is known and the position of the gap 13 is known, the system is fully determined for setup.

The position detection requires the position sensors 20 to be able to be aligned with the marking elements 21, in other words requires the marking elements 21 to be located above the sensors 20. However, this is only possible if the object carrier elements 6 are located in a defined position in which switching is also possible. This is the case when the object carrier elements 6 are coupled to the object carrier 3. Therefore, travel to the base position is initially carried out, during which all switching devices 10 are switched into the second switching position, in such a way that all object carrier elements 6 are coupled to the object carrier 3. For this purpose, the object carrier 3 is rotated through predetermined angles until the engagement elements 14A can engage in the corresponding recesses 17, the rotary encoder 25 detecting the associated rotational position, for example 72°.

The evaluation unit 23 is configured in such a way that the position at which there is no object carrier element 6, in other words where there is a gap 13, can be determined from the position signals of the position sensors 20. For example, the first position sensor 20.1 supplies the binary signal 1 if said sensor detects an object carrier element, the second position sensor 20.2 generates the binary signal 1, the third position sensor 20.3 generates the binary signal 1, the fourth position sensor 20.4 generates the binary signal 1, and the fifth position sensor 20.5 generates the binary signal 0, since no object carrier element is detected. The evaluation unit 23 receives the signal sequence "1, 1, 1, 1, 0". On the basis of this signal sequence, the evaluation unit 23 detects that there is a gap "0" between the first and the fourth carrier elements 6.1, 6.2. For a signal sequence "1, 1, 1, 0, 1", for example, the gap "0" is between the third and fourth object carrier elements 6.3, 6.4.

The evaluation unit 23 receives position data describing the position of the first object carrier element 6.1 in relation to a workstation from the input unit 24. The evaluation unit 23 evaluates the position signals of the position sensors 20 and the position data of the input unit 24, and generates a data set describing the position of the object carrier elements, which fully determines the system for setup.

The invention claimed is:

1. Transport device for transporting objects from workstation to workstation in a production system comprising a stationary assembly, an object carrier rotatable about an axis of rotation in successive work cycles, a plurality of object carrier elements, arranged circumferentially distributed and movable relative to the object carrier on a circular path, for depositing one or more objects, and a drive unit for driving the object carrier, wherein coupling elements are assigned to the object carrier elements, and can each take on only a first switching position or a second switching position, and actuators are assigned to the coupling elements, and are formed in such a way that the coupling elements are moved into the first or second switching position, in the first switching position, the coupling element being engaged with the stationary assembly and disengaged from the object carrier, in such a way that the object carrier element assigned to the coupling element remains at a workstation, and in the second switching position, the coupling element being disengaged from the stationary assembly and engaged with the object carrier, in such a way that the object carrier element assigned to the coupling element is moved from workstation to workstation.

2. Transport device according to claim 1, wherein a predetermined number of recesses arranged circumferentially distributed are provided on the stationary assembly, and a predetermined number of recesses arranged circumferentially distributed are provided on the object carrier, the number of recesses of the stationary assembly corresponding to the number of recesses in the object carrier, and the coupling element comprising a first engagement element which engages in one of the recesses of the stationary assembly in the first switching position, and the coupling element comprising a second engagement element which engages in one of the recesses of the object carrier in the second switching position, the first and second engagement elements being rigidly interconnected.

3. Transport device according to claim 2, wherein the recesses of the stationary assembly have radially inward-facing openings, and the recesses of the object carrier have radially outward-facing openings, the first and second engagement elements being guided displaceably in a radial direction in such a way that in the first switching position, the first engagement element engages in one of the recesses of the stationary assembly and, in the second switching position, the second engagement element engages in one of the recesses of the object carrier.

4. Transport device according to claim 3, wherein the coupling elements are guided longitudinally displaceably on guide elements, the actuators for moving the coupling elements being piston/cylinder arrangements to which a pressurising medium can be applied, in such a way that the coupling elements can be moved between the first and second switching positions.

5. Transport device according to claim 4, wherein the piston/cylinder arrangements are double-action piston/cylinder arrangements having two opposing piston faces to which a pressurising medium can be applied.

6. Transport device according to claim 1, wherein no object carrier element is arranged on one portion of the circular path, and an object carrier element of the object carrier elements is arranged on each of the other portions of the circular path.

7. Transport device according to claim 1, wherein a device for determining the positions of the object carrier elements is provided which comprises position sensors which are arranged circumferentially distributed and assigned to the individual object carrier elements, the sensors being formed in such a way that the sensors generate a position signal when an object carrier element of the object carrier elements is located in a position assigned to the respective sensor or no object carrier element is located in a position assigned to the respective sensor.

8. Transport device according to claim 7, wherein the position sensors are inductive sensors, marking elements detectable by the inductive sensors being arranged on the object carrier elements.

9. Transport device according to claim 7, wherein the device for determining the position of the object carrier elements comprises an input unit for inputting the position of one of the object carrier elements in the series of the object carrier elements in relation to a stationary reference system.

10. Transport device according to claim 9, wherein the device for determining the arrangement of the object carrier elements comprises an evaluation unit which evaluates the position signal of the position sensors and which is formed in such a way that on the basis of a position, inputted using the input unit, of one of the object carrier elements in relation to the stationary reference system, a data set describing the position of the object carrier elements in relation to the stationary reference system is generated.

11. Transport device according to claim 7, wherein the device for determining the arrangement of object carrier elements comprises a rotary encoder which generates a rotational position signal according to the rotational position of the object carrier.

12. Transport device according to claim 7, wherein the transport device comprises a control device for the drive unit of the object carrier, said control device being connected via a data line to the device for determining the position of the object carrier elements.

13. Transport device according to claim 1, wherein a guide path in which the object carrier elements are guided is provided.

14. Transport device according to claim 1, wherein the object carrier elements comprise a plurality of receiving elements which are each formed for receiving an object.

15. Production system for manufacturing products comprising a transport device for transporting objects according to claim 1, wherein a plurality of workstations arranged circumferentially distributed about the object carrier are provided, each of the workstations being formed to carry out a work process comprising at least one work step on at least one product which is arranged on an object carrier element of the object carrier elements.

* * * * *